(12) United States Patent
Fukushima

(10) Patent No.: US 6,478,127 B2
(45) Date of Patent: Nov. 12, 2002

(54) HYDRAULIC TORQUE TRANSMITTING DEVICE

(75) Inventor: Hirotaka Fukushima, Hirakata (JP)

(73) Assignee: Exedy Corporation, Osaka (JP)

(*) Notice: Subject to any disclaimer, the term of this patent is extended or adjusted under 35 U.S.C. 154(b) by 65 days.

(21) Appl. No.: 09/784,008

(22) Filed: Feb. 16, 2001

(65) Prior Publication Data
US 2001/0020564 A1 Sep. 13, 2001

(30) Foreign Application Priority Data
Mar. 9, 2000 (JP) ........................... 2000-064673

(51) Int. Cl.⁷ ............................................. F16H 45/02
(52) U.S. Cl. ........................ 192/3.29; 192/212; 464/66
(58) Field of Search .............................. 192/3.29, 212; 464/66

(56) References Cited

U.S. PATENT DOCUMENTS

| | | | |
|---|---|---|---|
| 2,844,049 A | * 7/1958 | Lapsley et al. | 192/3.3 |
| 4,510,747 A | * 4/1985 | Yoshida | 192/3.29 |
| 4,714,147 A | 12/1987 | Szodfridt et al. | |
| 4,966,261 A | * 10/1990 | Kohno et al. | 192/213.11 |
| 4,966,270 A | 10/1990 | Rispeter et al. | |
| 5,129,493 A | * 7/1992 | Edmunds | 192/3.21 |
| 6,112,869 A | * 9/2000 | Krause et al. | 192/213.1 |

FOREIGN PATENT DOCUMENTS

| | | |
|---|---|---|
| DE | 42 11 840 A | 10/1992 |
| DE | 42 13 341 A | 11/1992 |
| DE | 195 14 411 A | 11/1995 |
| DE | 199 20 542 A | 11/1999 |
| JP | 11-324609 A | 11/1999 |

OTHER PUBLICATIONS

U.S. patent application Ser. No. 09/695,082, Fukushima, filed Oct. 2000.

* cited by examiner

Primary Examiner—Saúl Rodriguez
(74) Attorney, Agent, or Firm—Shinjyu Global IP Counselors, LLP

(57) ABSTRACT

A torque converter 1 is provided with a configuration that improves the ability to assemble a hydraulic torque transmitting device. The torque converter 1 serves to transmit torque from engine crankshaft 2 to a transmission. Torque converter 1 is equipped with a torque converter main body 5 that has a fluid chamber therein and a damper mechanism 6 that serves to elastically couple torque converter main body 5 directly to the crankshaft 2 such that the coupling is elastic in the rotational direction. The assembly operation of the crankshaft 2 and the clutch cover assembly 8 is accomplished only by axially moving the crankshaft 2 and the clutch cover assembly 8 toward each other without requiring any fastening elements, such as bolts, rivets or the like.

19 Claims, 3 Drawing Sheets

HYDRAULIC TORQUE TRANSMITTING DEVICE

BACKGROUND OF THE INVENTION

1. Field of the Invention

The present invention relates to a hydraulic torque transmitting device. More particularly, the present invention relates to a hydraulic torque transmitting device that has a damper mechanism provided on the outside of the main body thereof.

2. Background Information

A torque converter is a device that has three types of bladed wheels (i.e., impeller, turbine, and stator) on the inside thereof and transmits power by means of a fluid contained therein. A lockup device is provided within the fluid chamber of the torque converter to mechanically transmit torque to the output member. The lockup device comprises basically a piston that is movable in the axial direction and a damper mechanism that is provided between the piston and the output member. When torque fluctuations are transmitted from the engine to the lockup coupling, the fluctuations are absorbed and damped by the damper mechanism.

A structure in which the damper mechanism is provided externally to the fluid chamber of the torque converter is also known. Such an external damper mechanism is disposed between the tip of the crankshaft and the front cover of the torque converter and has the same structure as a conventional clutch disk assembly type damper mechanism. For example, the damper mechanism might comprise a first disk-shaped member, a pair of second disk-shaped members disposed axially on both sides of the first disk-shaped member, and an elastic member disposed inside a window hole of the first disk-shaped member and supported by the support part of the pair of second disk-shaped members. The inner circumferential border of such a damper mechanism might, for example, be fixedly coupled to the crankshaft with a bolt and the outer circumferential border might be fixedly coupled to the front cover of the torque converter with a bolt. In short, bolts or other fastening members must be used when the torque converter is assembled onto the crankshaft.

In view of the above. there exists a need for a hydraulic torque transmitting device, which overcomes the above mentioned problems in the prior art. This invention addresses this need in the prior art as well as other needs, which will become apparent to those skilled in the art from this disclosure.

SUMMARY OF THE INVENTION

One object of the present invention is to provide a hydraulic torque transmitting device that is configured to improve the ability to assemble the hydraulic torque transmitting device.

The foregoing objects can be attained by providing a hydraulic torque transmitting device for transmitting torque from the crankshaft of an engine to a transmission. The hydraulic torque transmitting device is equipped with a main body having a fluid chamber formed therein, a fluid driven member arranged within the fluid chamber of the main body and a damper mechanism for elastically coupling the main body directly to the crankshaft. The fluid driven member is arranged within the fluid chamber of the main body such that rotation of the main body causes fluid within the fluid chamber of the main body to rotate the fluid driven member. The fluid driven member has an output member adapted to be coupled to the transmission. The damper mechanism has a first and second coupling parts configured to elastically couple the main body to the crankshaft in a rotational direction. The first coupling part is coupled to the main body. The second coupling part is elastically coupled to the first coupling part and configured to be fixedly coupled directly to the crankshaft. Thus, the main body is coupled to the crankshaft such that the coupling is elastic in the rotational direction. The overall structure of this hydraulic torque transmitting device is simple because the main body is coupled directly to the crankshaft via the damper mechanism.

The hydraulic torque transmitting device can also be provided with an additional stipulation that the damper mechanism have an elastic member held by either one of the crankshaft and the main body and engaged with the other in such a manner that it is attachable and detachable in the axial direction. In other words, the damper mechanism includes at least one elastic member configured to be retained by one of the first and second coupling parts with the other of the first and second coupling parts being attachable and detachable in an axial direction. With this hydraulic torque transmission device, assembly can be accomplished by moving the main body in the axial direction so that it is close to the crankshaft. In short, the ability assemble of the hydraulic torque transmission device is improved because the device is separable in the axial direction at the damper mechanism.

In accordance with another aspect of the present invention, the hydraulic torque transmitting device can be further provided with the additional stipulation that the device main body have a plate forming the engine facing side wall of the fluid chamber. Also, the damper mechanism has the following: an elastic member support part formed on the plate; an elastic member, both rotational-direction borders and the axial direction transmission side of which are held by the elastic member support part; and a drive member that is fixedly coupled to the crankshaft and has an abutting part that is freely attachable and detachable in the axial direction with respect to both rotational-direction borders of the elastic member. With this hydraulic torque transmitting device, the elastic member is held by the plate of the main body in advance. Also, when the hydraulic torque transmitting device is assembled to the crankshaft, the abutting part of the drive member is made to engage from the axial direction with both circumferential-direction borders of the elastic member.

In accordance with another aspect of the present invention, the hydraulic torque transmitting device can further be provided with an additional stipulation that the plate have a holding part for holding the axial direction engine side of the elastic member. With this hydraulic torque transmitting device, the elastic member cannot drop from the plate because of the holding part.

In accordance with another aspect of the present invention, the hydraulic torque transmitting device can further be provided with an additional stipulation that a mass body be fixedly coupled to said crankshaft. With this hydraulic torque transmitting device, the structure is simple because the mass body is fixed directly to the crankshaft and does not engage with the hydraulic torque transmitting device or the damper mechanism.

In accordance with another aspect of the present invention, the hydraulic torque transmitting device can further be provided with an additional stipulation that the mass body have a disk-shaped member whose inner circumferential border is fixedly coupled to the crankshaft and a ring-shaped member fixedly coupled to the outer circumferential border of the disk-shaped member. With this hydraulic torque transmitting device, the axial dimension of the entire hydraulic torque transmitting device is shortened while still maintaining sufficient inertia because the ring-shaped member is fixedly coupled to the outer circumferential border of the disk-shaped member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A selected embodiment of the present invention will now be explained with reference to the drawings. It will be apparent to those skilled in the art from this disclosure that the following description of the preferred embodiment of the present invention is provided for illustration only, and not for the purpose of limiting the invention as defined by the appended claims and their equivalents.

Figure 1:
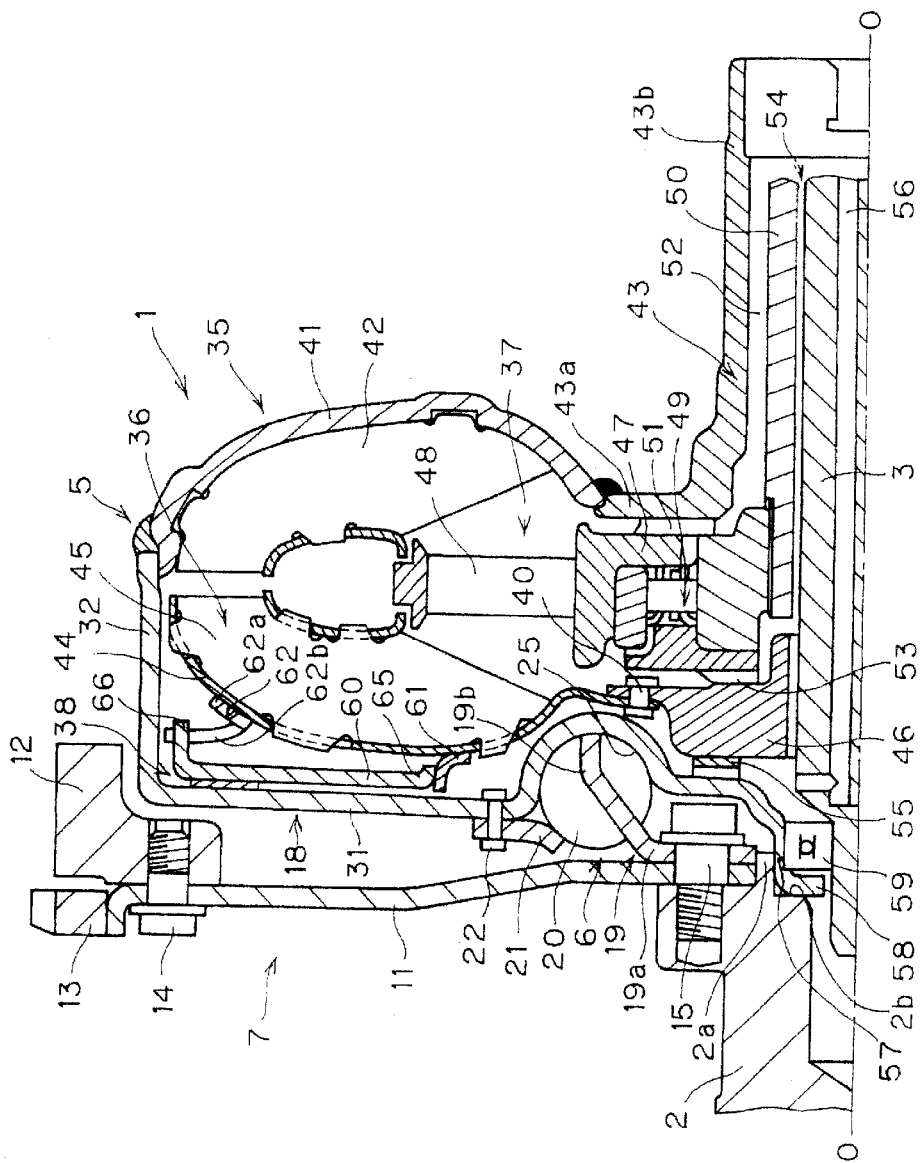
FIG. 1 is a vertical schematic cross-sectional view of a torque converter in accordance with one embodiment of the present invention.

Referring initially to FIG. 1, a longitudinal cross-sectional view of a torque converter 1 is shown according to a first embodiment of the present invention. The torque converter 1 is an apparatus for enabling and disabling transmission of torque from a crankshaft 2 of an engine to a main drive shaft 3 of a transmission. The centerline O—O in FIG. 1 represents the rotational axis of the torque converter 1. The engine (not shown) is disposed on the left side of FIG. 1, and the transmission (not shown) is disposed on the right side of FIG. 1. The torque converter 1 serves to transmit torque from the crankshaft 2 of an engine to the main drive shaft 3 of a transmission.

The torque converter 1 basically comprises a torque converter main body 5 having a fluid chamber and a damper mechanism 6 for coupling the torque converter main body 5 directly to crankshaft 2.

The crankshaft 2 is provided with a mass body 7. The mass body 7 is fixedly coupled to the end of the crankshaft 2 and serves to ensure a large moment of inertia on the crankshaft 2 side of the device. The mass body 7 includes a disk-shaped member 11 and an annular ring-shaped member 12. The disk-shaped member 11 is secured at its inner peripheral end to the distal end of the crankshaft 2 by a plurality of bolts 15. The bolts 15 are axially inserted through holes from the axial direction transmission side of the disk-shaped member 11 and then threaded into holes of the crankshaft 2. The inner peripheral edge of the disk-shaped member 11 engages an outer peripheral surface of an annular protrusion 2a formed on the distal end surface of the crankshaft 2. The annular ring-shaped member 12 is secured to the axial transmission side of the outer peripheral end of the disk-shaped member 11. The annular ring-shaped member 12 is an inertia member having a relatively large axial thickness. The annular ring-shaped member 12 is secured to the disk-shaped member 11 with a plurality of circumferentially arranged bolts 14. The bolts 14 are axially threadedly inserted from the engine side. A ring gear 13 is provided for starting the engine. The ring gear 13 is secured to the outer peripheral edge of the disk-shaped member 11. The entire mass body 7 can be formed as an integral member as needed and/or desired.

The damper mechanism 6 serves to elastically couple the torque converter main body 5 directly to the crankshaft 2 in such a manner that the coupling is elastic in the rotational direction. The damper mechanism 6 basically comprises an inner circumferential portion of a front cover 18 that forms a first coupling part, a drive member 19 that forms a second coupling part, a plurality of elastic members 20 that elastically couples the first and second coupling parts together, and a holding plate 21 that also forms part of the first coupling part.

Figure 2:
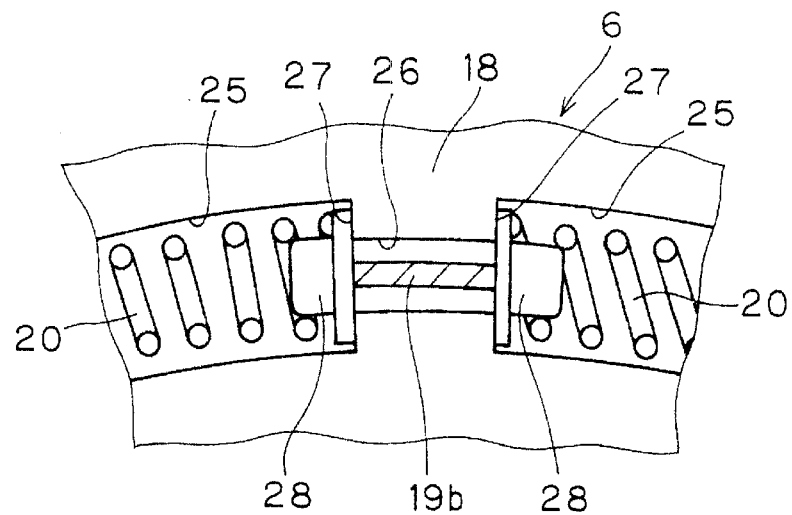
FIG. 2 is a partial side elevational view of a portion of the torque converter illustrated in FIG. 1 for explaining the damper mechanism.

As seen in FIGS. 1 and 2, the inner circumferential portion of the front cover 18 has a plurality of spring support parts 25. Each spring support part 25 extends in the rotational direction of the front cover 18. The support parts 25 are circumferentially arranged in the external surface of the front cover 18 to receive the elastic members 20 therein. The support parts 25 and the holding plate 21 form a first coupling part of the damper mechanism 6, while the drive member 19 forms a second coupling part of the damper mechanism 6. The spring support parts 25 are protruding portions formed by drawing or stamping the metal of the front cover 18 so that they protrude in an axial direction towards the transmission side of the main body 5. Thus, the spring support parts 25 form recesses on the outside surface of the front cover 18 that faces in an axial direction towards the engine side. In other words, a portion or plate 31 of the front cover 18 that faces in an axial direction towards the engine side includes the recesses or spring support parts 25.

The front cover 18 also includes a plurality of recesses or recessed parts 26 that are narrower than the spring holding parts 25 in the radial direction. The recessed parts 26 are formed between the spring holding parts 25 in the circumferential direction. The recessed parts 26 receive a portion of the drive member 19 as explained below. Thus, the front cover 18 of the main body 5 includes a plurality of first recesses or spring support parts 25 and a plurality of second recesses or recessed parts 26 with the recessed parts 26 being formed between the spring support parts 25 in the front cover 18 of the main body 5.

The drive member 19 is a ring-shaped plate member that is fixedly coupled to the end of the crankshaft 2 by the plurality of bolts 15. The drive member 19 has a ring-shaped attachment portion 19a and an abutting part with a plurality of spring abutting flanges 19b. The attachment portion 19a abuts against the axial direction transmission side of the inner circumferential border of disk-shaped member 11. The attachment portion 19a has a plurality of holes for receiving the bolts 15 therethrough to attach the drive member 19 to the end of the crankshaft 2. The abutting flanges 19b extend from the outer circumferential edge of the drive member 19 toward the transmission in the axial direction. The second recesses or recessed parts 26 are configured to axially receive of the abutting flanges 19b therein. Thus, the abutting flanges 19b engage the rotational ends of the elastic members 20 to compress the elastic members 20 when the drive member 19 rotates relative to the main body 5. This arrangement allows the abutting flanges 19b to be freely attachable and detachable in an axial direction with respect to the both rotational ends of the elastic members 20.

Each elastic member 20 is a coil spring that extends lengthwise in the circumferential direction. Each elastic member 20 is housed inside one of the spring holding parts 25. A spring seat 28 is disposed at both circumferential-direction ends of elastic member 20. The spring seats 28 support both circumferential-direction ends each elastic member 20 and abut against both radial-direction sides of the recessed parts 26, i.e., both end faces of spring support parts 25. The spring seats 28 have a support part that supports elastic member 20 and a protruding part that extends from said support part into the coil of elastic part 20. Here, the abutting flanges 19b of the aforementioned the drive member 19 extend inside the recessed parts 26 and the circumferential-direction ends thereof abut against or are close to the rear face of the support parts of the spring seats 28. Thus, the torque on the drive member 19 is transmitted to the front cover 18 via the elastic members 20.

Also, an arc-shaped or ring-shaped holding plate 21 is fixedly coupled to the outer circumferential portion of spring holding members 25 with a plurality of rivets 22. The holding plate 21 supports the axial sides of elastic members 20 that face in a direction towards the engine. Preferably, the holding plate 21 is located at the radial direction outside portions of the elastic members. Consequently, it supports the axial side of elastic members 20 at the radial-direction outside thereof. Consequently, the elastic members 20 are held to front cover 18 and will not move in the axial direction.

Furthermore, the abutting flanges 19b of the drive member 19 can be engaged and/or disengaged from the elastic members 20 by simply moving the drive member 19 in the axial direction of the torque converter 1. The type of elastic member is not limited to a coil spring, as shown. Thus, the elastic member might also be a bent-plate spring formed by folding a plate-shaped member into a plurality of spring elements.

As explained previously, the inner circumferential portion of front cover 18 serves as the output member of the damper mechanism 6. Giving a single member multiple functions reduces the total number of components.

In the torque converter main body 5, a ring-shaped fluid chamber filled with working fluid is formed by the front cover 18 and the impeller shell 41 of the impeller 35. The front cover 18 is a ring-shaped plate member disposed on the engine side. The aforementioned spring support parts 25 are disposed on the inner circumferential part of the front cover 18. Additionally, the innermost circumferential portion of the front cover 18 comprises a cylindrical part 57 and a flange 58 extending radially inward from the end of the cylindrical part 57. The outer circumferential surface of cylindrical part 57 is supported by the outer circumferential surface of protrusion 2a and the axial direction engine side of flange 58 abuts against the axial direction end face 2b of the crankshaft 2. Thus, the radial and axial positions of the front cover 18 with respect to the crankshaft 2 are determined. Also, the bearings 59 are disposed between cylindrical part 57 and the end of the main drive shaft 3. In other words, the end of the main drive shaft 3 is supported in the radial direction by the end of the crankshaft 2 via the bearings 59. Both axial direction sides of the bearings 59 are sealed. The outer circumferential portion of the front cover 18 comprises a flat disk-shaped part 31 and a cylindrical part 32 that extends in the axial direction from the outer circumferential edge of the disk-shaped part 31 toward the transmission. The outer circumferential edge of the impeller shell 41 is fixedly secured to the end of cylindrical part 32 by welding or the like.

The fluid chamber side of impeller shell 41 is provided with a plurality of blades 42. An impeller hub 43 is fixedly coupled to the inner circumferential edge of the impeller shell 41. The impeller hub 43 has a disk-shaped part 43a that faces the stator 37 (discussed later) and a cylindrical part 43b that extends in the axial direction from the inner circumferential edge of disk-shaped part 43a toward the transmission. Thus, impeller 35 basically comprises an impeller shell 41, a plurality of blades 42 and an impeller hub 43.

A turbine 36 is disposed within the fluid chamber in such a position that it is face-to-face with the impeller 35 in the axial direction. The turbine 36 comprises a turbine shell 44 and a plurality of blades 45 fixedly coupled thereto. The inner circumferential edge of turbine shell 44 is fixedly coupled to a turbine hub 46 by means of a plurality of rivets 40. That turbine hub 46 is splined to the main drive shaft 3.

The stator 37 is disposed between the inner circumferential part of the impeller 35 and the inner circumferential part of the turbine 36. The stator 37 basically comprises a carrier 47 and a plurality of blades 48 provided on the outer circumferential surface of the carrier 47. Stator 37 is a mechanism that serves to direct the flow of the working fluid flowing from turbine 36 to the impeller 35. The stator 37 is supported by fixed shaft 50 via a one-way clutch 49. The fixed shaft 50 is a cylindrical member disposed on the inner circumferential side of cylindrical part 43b of the impeller 43 and is fixedly coupled to the front cover (not shown in the drawings) of the transmission. The impeller 35, the turbine 36, and the stator 37 form a torus-shaped fluid operating chamber that transmits torque using the action of the fluid contained within the fluid chamber.

The carrier 47 and the one-way clutch 49 of the stator 37 are axially supported and disposed between the impeller hub 43 and the turbine hub 46, and the space between each and the two hubs establishes a fluid passage running in the radial direction. The gap 51 between the stator 37 and impeller hub 43 communicates with a first fluid path 52 existing between impeller hub 43 and fixed shaft 50. The gap 53 between the stator 37 and turbine hub 46 communicates with a second fluid path 54 existing between fixed shaft 50 and main drive shaft 3. The first fluid path 52 and the second fluid path 54 communicate with a hydraulic operating mechanism (not shown in the drawings) comprising an oil pump, control valves and various fluid paths.

A washer 55 is disposed axially between the turbine hub 46 and the inner circumferential portion (the portion farther inward than spring support parts 25) of the front cover 18. The washer 55 has a plurality of grooves running in the radial direction which allow working fluid to move in both radial directions through the washer 55. The radial-direction gap secured by the washer 55 communicates with a third fluid path 56 formed within the main drive shaft 3.

The lockup clutch 38 basically comprises a piston 60. The piston 60 is a disk-shaped or a ring-shaped plate member that is disposed between the front cover 18 and the turbine 36. The outer diameter of the piston 60 is roughly the same as the outer diameter of the torus, and the inner diameter larger than the outer diameter of the damper mechanism 6.

A wet frictional facing is applied to the axial direction engine side of the outer circumferential portion of the piston 60. The frictional facing faces the flat frictional surface of the front cover 18. The inner circumferential surface of the piston 60 is supported by the outer circumferential surface of ring-shaped member 61, which is fixedly coupled to the turbine shell 44. This determines the position of the piston in the radial direction. The outer circumferential edge of the piston 60 has a plurality of engaging claws 66 that extend in the axial direction toward the transmission. A driven plate 62 is provided on the outer circumferential portion of the turbine shell 44. The driven plate 62 is a ring-shaped plate member, which has a ring-shaped part 62a and a plurality of engaging claws 62b. The ring-shaped part 62a is fixedly coupled to the turbine shell 44 and the engaging claws 62b extend in the radial direction from the ring-shaped part 62a and engage with the engaging claws 66. Due to this engagement, piston 60 rotates integrally with turbine 36 but can move in the axial direction.

Next the operation of the torque converter 1 is explained. The torque from the crankshaft 2 is transmitted to torque converter main body 5 via the damper mechanism 6. When impeller 35 of torque converter main body 5 rotates, the turbine 36 is driven by the fluid and the accompanying torque is outputted from the turbine hub 46 to the main drive shaft 3. When the engine is started and when the vehicle is traveling at a low speed, working fluid is fed from third fluid path 56 to the space between the turbine shell 44 and the front cover 18 via the grooves of the washer 55. This fluid flows to the outer circumferential side, passes between the piston 60 and the front cover 18, and flows into the fluid operating chamber through the gap between the outlet of the impeller 35 and the inlet of the turbine 36. The working fluid inside the fluid operating chamber flows, for example, from the gap 53 into the second fluid path 54. As a result of this flow pattern of the working fluid, the piston 60 moves in the axial direction toward the transmission and the frictional facing separates from the front cover 18.

When the vehicle speed exceeds 10 km/h, for example, the working fluid in the space between the piston 60 and the front cover 18 drains from the third fluid path 56. Then, the piston 60 moves in the axial direction toward the engine due to the pressure inside the fluid chamber and the frictional facing is pressed against the front cover 18. As a result, the torque of the front cover 18 is transmitted directly to the turbine 36 in a mechanical manner, While this is occurring, the working fluid flows, for example. from the first fluid path 52, through the gap 51, and into the fluid operating chamber and also flows out from the gap 53 into the second fluid path 54.

The piston response during the lockup operation described above is improved because the damper mechanism is not provided on the piston 60, and consequently, the weight of the piston 60 is smaller. Also, the torque fluctuations transmitted from the engine through the lockup coupling are absorbed and damped by the elastic members 20 of the damper mechanism 6. When this occurs, as is clear from the mechanical circuit drawing shown in FIG. 3, the mass body 7 functions as the mass of the input side and the entire torque converter main body 5 functions as the mass of the output side in a vibration system having its center at the elastic members 20 of the damper mechanism 6. Thus, the torque converter main body 5 can be used as the inertia of the output side and the inertia of the output side will be sufficiently larger than that of the input side. As a result, an effect similar to that of a divided type flywheel for vibration damping is obtained.

Figure 3:
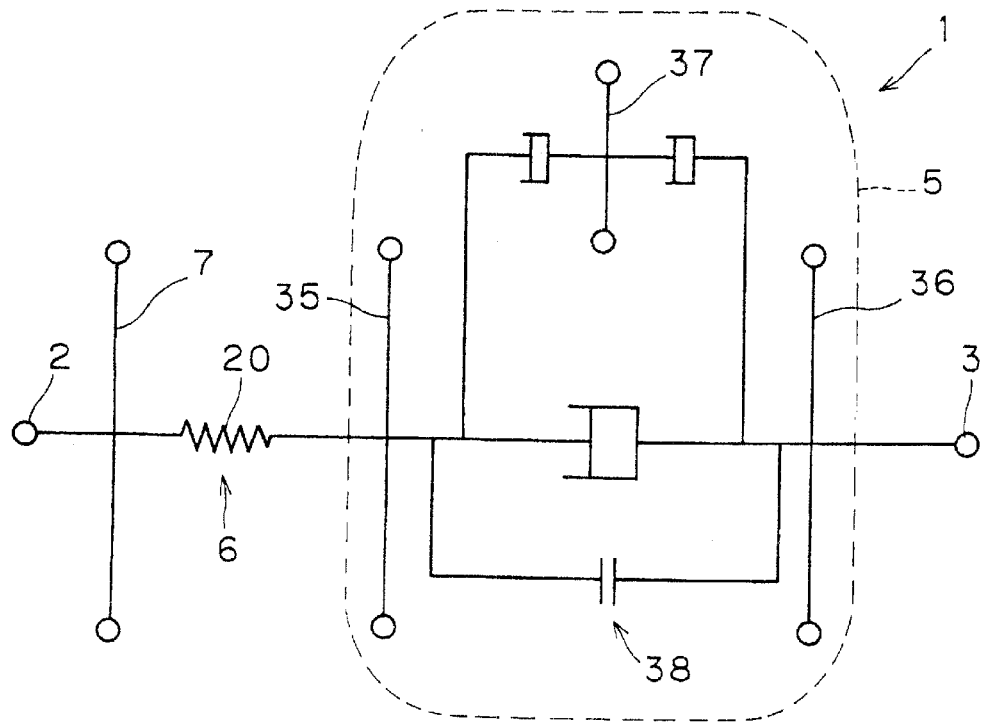
FIG. 3 is a mechanical circuit diagram of the torque converter illustrated in FIG. 1.
Figure 4:
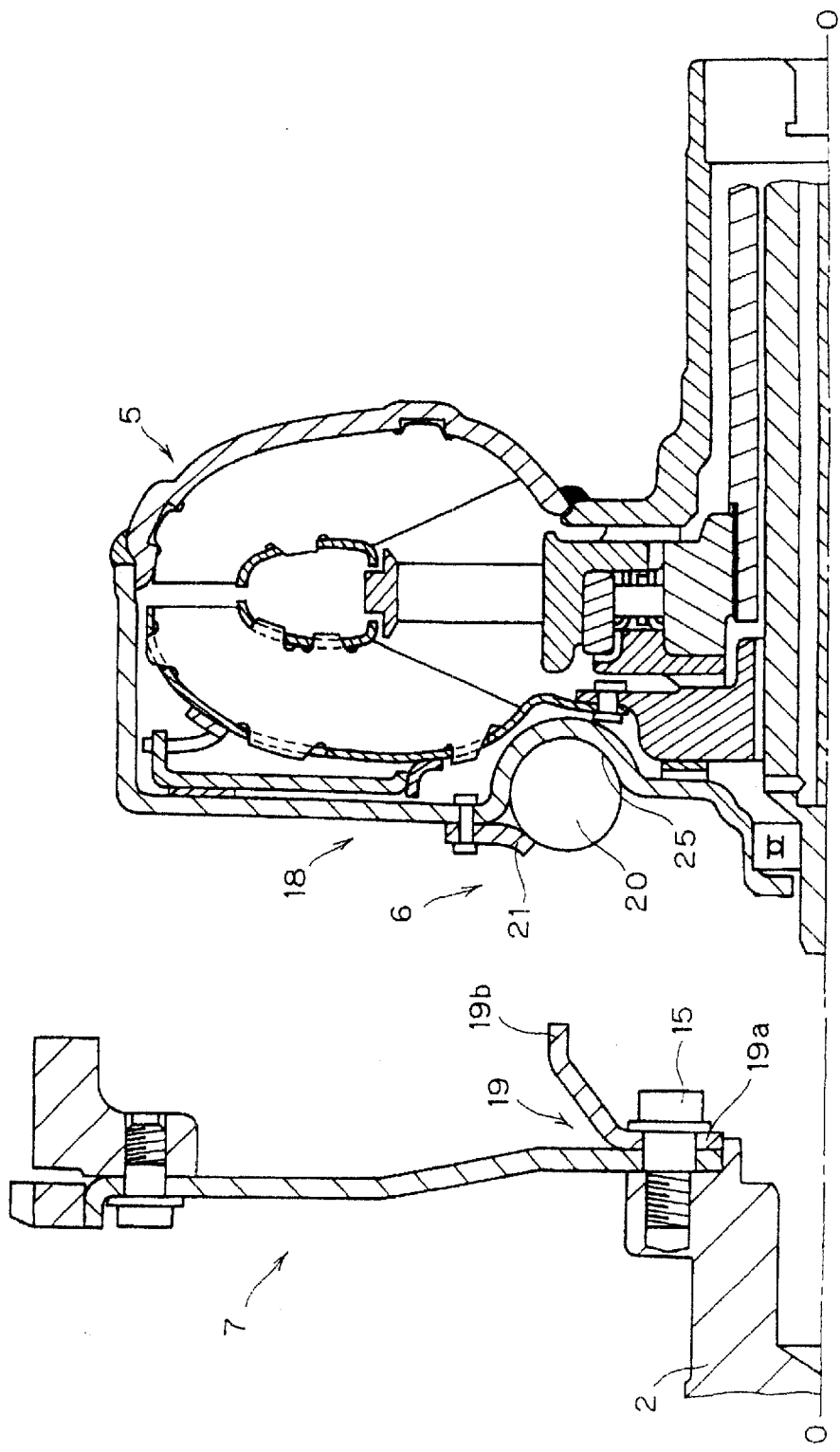
FIG. 4 is a vertical schematic cross-sectional view of the torque converter illustrated in FIG. 1 for explaining the operation of assembling the torque converter to the crankshaft.

Next the assembly operation of the torque converter 1 is explained. On the engine side, as shown in FIG. 3, the mass body 7 and the drive member 19 are fixed in advance to the end of the crankshaft 2 with the bolts 15. Also, the elastic members 20 are mounted to the front cover 18 in advance. Thus, before the assembly operation, the chief components of damper mechanism 6 (i.e., the elastic members 20) are attached in advance to a part of torque converter main body 5 (i.e., front cover 18). Consequently, the torque converter main body 5 and the elastic members 20 is more conveniently transported and stored before assembly.

Therefore, if, for example, the engine and crankshaft 2 are moved in the axial direction toward the transmission, the abutting flanges 19b of the drive member 19 will be inserted circumferentially between the elastic members 20 that are on the axial direction transmission side, or more particularly, between the spring seats 28. When axial direction end face 2b of the crankshaft 2 abuts against the flange 58 of the front cover 18, the axial relative motion between the two components stops. As mentioned previously, the assembly of torque converter main body 5 onto the crankshaft 2 can be completed using only axial relative motion between the members on both sides and such fastening members as bolts and rivets are not needed. Consequently, the work of assembling the torque converter 1 is simplified and the time required for the assembly work is shortened.

It is also acceptable for the damper mechanism 6 to be mounted to the crankshaft side before assembly. The form of the damper mechanism 6 is not limited to that of the previously described embodiment The damper mechanism 6 can also be a combination of springs and a friction generating mechanism or a combination of springs and a viscous resistance generating means. The hydraulic torque transmitting device may also be a fluid coupling instead of a torque converter.

EFFECTS OF THE INVENTION

With a hydraulic torque transmitting device in accordance with the present invention, the overall structure is simplified because the main body 5 is coupled directly to the crankshaft 2 via the damper mechanism 6. Furthermore, the ability to assemble the hydraulic-torque transmitting device is greatly improved because assembly can be accomplished by moving the hydraulic torque transmitting device in the axial direction until it is close to the crankshaft 2.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A hydraulic torque transmitting device adapted to transmit a torque from a crankshaft of an engine to a transmission, said hydraulic torque transmitting device comprising:

a main body having a fluid chamber therein;

a fluid driven member arranged within said fluid chamber of said main body such that rotation of said main body causes fluid within said fluid chamber of said main body to rotate said fluid driven member, said fluid driven member having an output member adapted to be coupled to the transmission; and a damper mechanism having a first and second coupling parts configured to elastically couple said main body to the crankshaft in a rotational direction, said first coupling part being coupled to said main body and said second coupling part being elastically coupled to said first coupling part and configured to be fixedly coupled directly to the crankshaft, said damper mechanism including at least one elastic member configured to be retained by one of said first and second coupling parts with the other of said first and second coupling parts being non-fixedly attachable and detachable in an axial direction.

2. A hydraulic torque transmitting device as recited in claim 1, wherein said main body includes a plate forming an engine facing side wall of said fluid chamber, and said first coupling part of said damper mechanism includes a support part formed in said plate, which is configured such that said elastic member has both rotational ends and an axial side transmission side held by said support part, and said second coupling part of said damper mechanism includes a drive member having an attachment portion configured to be fixedly coupled to the crankshaft and an abutting part that is freely attachable and detachable in an axial direction with respect to the both rotational ends of said elastic member.

3. A hydraulic torque transmitting device as recited in claim 2, wherein said first coupling part of said damper mechanism further includes a holding part configured to hold an axial engine facing side of said elastic member.

4. A hydraulic torque transmitting device as recited in claim 1, further comprising a mass body configured to be fixedly coupled to the crankshaft.

5. A hydraulic torque transmitting device as recited in claim 4, wherein said mass body has a disk-shaped member with an inner circumferential end configured to be fixedly coupled to the crankshaft, and a ring-shaped member that is fixedly coupled to an outer circumferential end of said disk-shaped member.

6. A hydraulic torque transmitting device as recited in claim 1, further comprising a mass body configured to be fixedly coupled to the crankshaft.

7. A hydraulic torque transmitting device as recited in claim 6, wherein said mass body has a disk-shaped member with an inner circumferential end configured to be fixedly coupled to the crankshaft, and a ring-shaped member that is fixedly coupled to an outer circumferential end of said disk-shaped member.

8. A hydraulic torque transmitting device as recited in claim 1, wherein said main body includes an impeller; and said fluid driven member includes a turbine with a plurality of blades located adjacent said impeller and a turbine hub configured to be coupled to a drive shaft of the transmission.

9. A hydraulic torque transmitting device as recited in claim 8, wherein said main body further includes a front cover and an impeller shell coupled together to form said fluid chamber of said main body.

10. A hydraulic torque transmitting device as recited in claim 9, further comprising a lockup clutch disposed between said front cover and said turbine.

11. A hydraulic torque transmitting device as recited in claim 10, wherein said lockup includes a piston that is non-rotatably coupled to said turbine but axially movably between said front cover and said turbine.

12. A hydraulic torque transmitting device adapted to transmit a torque from a crankshaft of an engine to a transmission, said hydraulic torque transmitting device comprising:

a main body having a fluid chamber therein, said main body including a plate forming an engine facing side wall of said fluid chamber;

a fluid driven member arranged within said fluid chamber of said main body such that rotation of said main body causes fluid within said fluid chamber of said main body to rotate said fluid driven member, said fluid driven member having an output member adapted to be coupled to the transmission;

a damper mechanism having a first and second coupling parts configured to elastically couple said main body to the crankshaft in a rotational direction, said first coupling part being coupled to said main body and said second coupling part being elastically coupled to said first coupling part and configured to be fixedly coupled directly to the crankshaft, said damper mechanism including at least one elastic member configured to be retained by one of said first and second coupling parts with the other of said first and second coupling parts being attachable and detachable in an axial direction, said first coupling part of said damper mechanism including a support part formed in said plate, which is configured such that said elastic member has both rotational ends and an axial side transmission side held by said support part, and said second coupling part of said damper mechanism including a drive member an attachment portion configured to be fixedly coupled to the crankshaft and an abutting part that is freely attachable and detachable in an axial direction with respect to the both rotational ends of said elastic member; and a mass body configured to be fixedly coupled to the crankshaft.

13. A hydraulic torque transmitting device as recited in claim 12, wherein said mass body has a disk-shaped member with an inner circumferential end configured to be fixedly coupled to the crankshaft, and a ring-shaped member that is fixedly coupled to an outer circumferential end of said disk-shaped member.

14. A hydraulic torque transmitting device adapted to transmit a torque from a crankshaft of an engine to a transmission, said hydraulic torque transmitting device comprising:

a main body having a fluid chamber therein, said main body including an impeller, said fluid driven member including a turbine with a plurality of blades located adjacent said impeller and a turbine hub being configured to be coupled to a drive shaft of the transmission;

a fluid driven member arranged within said fluid chamber of said main body such that rotation of said main body causes fluid within said fluid chamber of said main body to rotate said fluid driven member, said fluid driven member having an output member adapted to be coupled to the transmission;

a damper mechanism having a first and second coupling parts configured to elastically couple said main body to the crankshaft in a rotational direction, said first coupling part being coupled to said main body and said second coupling part being elastically coupled to said first coupling part and configured to be fixedly coupled directly to the crankshaft, said damper mechanism including at least one elastic member configured to be retained by one of said first and second coupling parts with the other of said first and second coupling parts being attachable and detachable in an axial direction, said first coupling part of said damper mechanism including a plurality of first recesses formed in said main body, said first recesses being configured to support both rotational ends of said elastic member and an axial side of said elastic member that faces towards the transmission, and said second coupling part of said damper mechanism including a drive member having an attachment portion configured to be fixedly coupled to the crankshaft and an abutting part that is freely attachable and detachable in an axial direction with respect to the both rotational ends of said elastic member.

15. A hydraulic torque transmitting device as recited in claim 14, wherein said main body includes a plurality of second recesses formed between said first recesses in said main body, said second recesses being configured to axially receive flanges of said abutting part.

16. A hydraulic torque transmitting device as recited in claim 14, further comprising a mass body configured to be fixedly coupled to the crankshaft.

17. A hydraulic torque transmitting device as recited in claim 16, wherein said mass body has a disk-shaped member with an inner circumferential end configured to be fixedly coupled to the crankshaft, and a ring-shaped member that is fixedly coupled to an outer circumferential end of said disk-shaped member.

18. A hydraulic torque transmitting device as recited in claim 14, wherein said first coupling part of said damper mechanism further includes a holding part coupled to said main body to hold an axial engine facing side of said elastic member.

19. A hydraulic torque transmitting device as recited in claim 18, wherein said main body includes a plurality of second recesses formed between said first recesses in said main body, said second recesses being configured to axially receive flanges of said abutting part.

* * * * *